United States Patent
Oberdorfer et al.

(10) Patent No.: US 9,476,302 B2
(45) Date of Patent: Oct. 25, 2016

(54) DISCHARGING OF MATERIAL EXCAVATED IN UNDERGROUND WORKINGS

(71) Applicant: SANDVIK IMINING AND CONSTRUCTION MATERIALS HANDLING GMBH & CO KG, Loeben (AT)

(72) Inventors: Ralf Oberdorfer, Loeben (AT); Hubert Rieger, Loeben (AT)

(73) Assignee: SANDVIK MIINING AND CONSTRUCTION MATERIALS HANDLING GMBH & CO KG, Loeben (AT)

(*) Notice: Subject to any disclaimer, the term of this patent is extended or adjusted under 35 U.S.C. 154(b) by 0 days.

(21) Appl. No.: 14/894,512

(22) PCT Filed: May 13, 2014

(86) PCT No.: PCT/EP2014/059716
§ 371 (c)(1),
(2) Date: Nov. 28, 2015

(87) PCT Pub. No.: WO2014/191196
PCT Pub. Date: Dec. 4, 2014

(65) Prior Publication Data
US 2016/0115791 A1 Apr. 28, 2016

(30) Foreign Application Priority Data
May 28, 2013 (AT) ...................................... 443/2013

(51) Int. Cl.
*E21C 35/20* (2006.01)
*B65G 21/14* (2006.01)
(Continued)

(52) U.S. Cl.
CPC ............... *E21F 13/02* (2013.01); *B65G 21/14* (2013.01); *B65G 39/12* (2013.01); *B65G 41/008* (2013.01)

(58) Field of Classification Search
CPC ..... E21F 13/083; B65G 21/14; B65G 41/00; E21C 35/20
USPC ........... 198/312, 314, 592, 594, 812; 299/43
See application file for complete search history.

(56) References Cited

U.S. PATENT DOCUMENTS 5,056,655 A 10/1991 Justice
5,246,274 A 9/1993 Smith et al.
(Continued)

FOREIGN PATENT DOCUMENTS

| AU | 687307 B2 | 2/1998 |
|---|---|---|
| DE | 3837986 A1 | 5/1990 |
| WO | 2008031125 A2 | 3/2008 |

*Primary Examiner* — Douglas Hess
(74) *Attorney, Agent, or Firm* — Corinne R. Gorski

(57) ABSTRACT

A device for the conveying of material excavated in underground workings in a mine road stretch including a belt conveyor system which has an endless conveyor belt having a conveyor section which is continually extendible along a conveyor stretch in step with the rate of advance. The belt conveyor has at least one first support device and a plurality of inter-coupled conveyor belt vehicles movable in the longitudinal direction of the conveyor stretch, each carrying support elements. Arranged between the first support device and the plurality of conveyor belt vehicles is a second movable support device for coupled to the first support device and including guide means for the introduction of conveyor belt vehicles into the conveyor stretch. At least one part of the conveyor belt vehicles arranged in the conveyor stretch are guided in movable guide frame elements in the longitudinal direction of the conveyor stretch.

13 Claims, 9 Drawing Sheets

Figure 1:
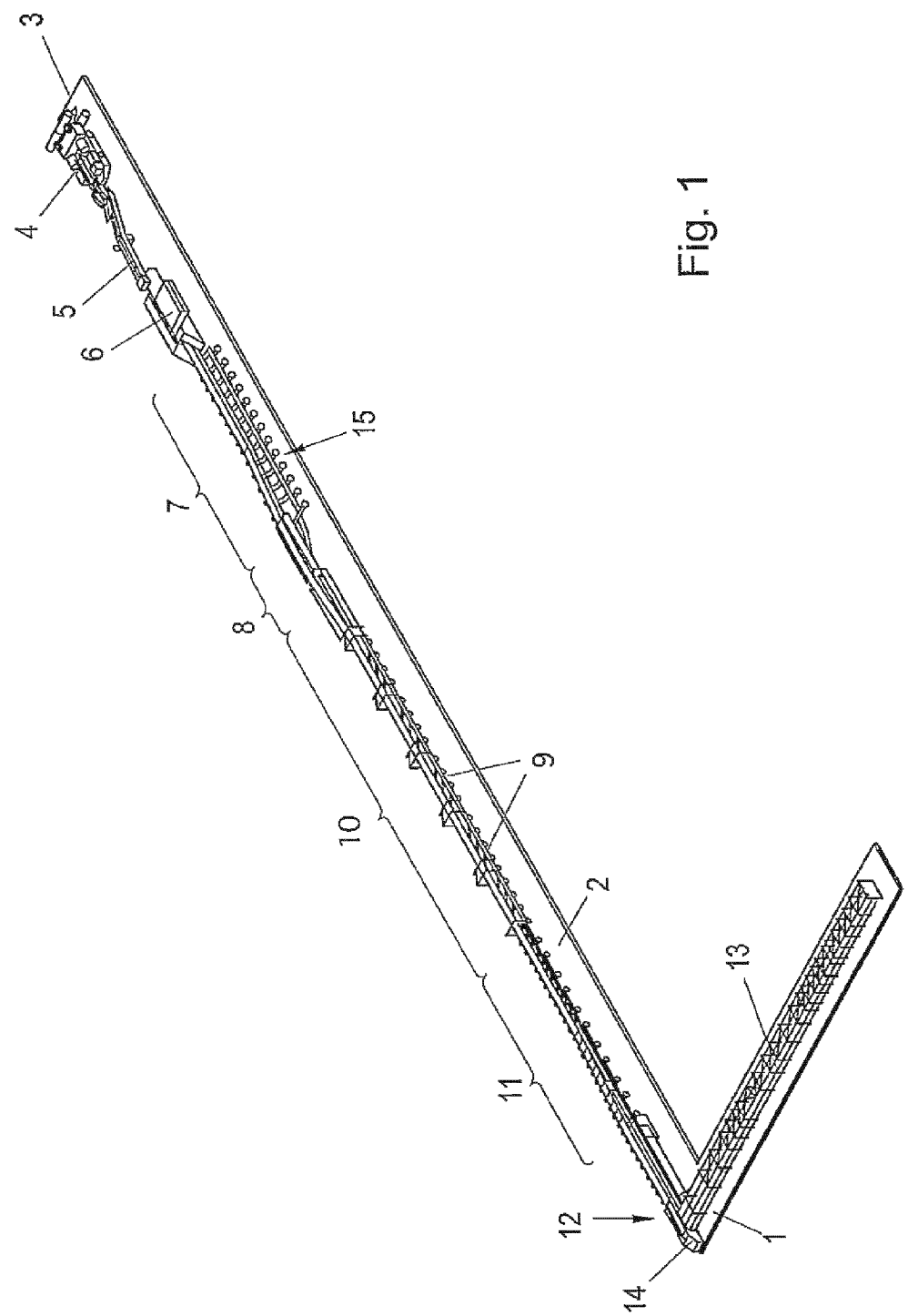

(51) Int. Cl.
*B65G 41/00* (2006.01)
*E21F 13/02* (2006.01)
*B65G 39/12* (2006.01)

(56) References Cited

U.S. PATENT DOCUMENTS

| | | | |
|---|---|---|---|
| 5,353,920 A * | 10/1994 | Szalankiewicz | B65G 15/62 198/823 |
| 5,582,466 A * | 12/1996 | Delli-Gatti, Jr. | E21C 35/20 299/18 |
| 5,692,807 A * | 12/1997 | Zimmerman | E21F 13/083 299/30 |
| 5,795,032 A * | 8/1998 | Zimmerman | E21C 29/24 299/33 |
| 6,095,320 A | 8/2000 | DeMong et al. | |
| 6,220,670 B1 * | 4/2001 | Mraz | E21C 25/58 198/303 |
| 6,644,753 B2 * | 11/2003 | Mraz | E21C 25/58 299/1.4 |
| 6,729,464 B2 * | 5/2004 | Thomas | B65G 17/26 198/312 |
| 7,658,271 B2 * | 2/2010 | Fuchs | B65G 21/14 198/311 |
| 7,980,806 B1 | 7/2011 | Conner et al. | |
| 8,393,456 B2 * | 3/2013 | de Lore | B65G 15/00 198/313 |
| 8,985,317 B2 * | 3/2015 | Martin | B65G 39/125 198/818 |
| 2010/0276260 A1 | 11/2010 | De Lore et al. | |

* cited by examiner

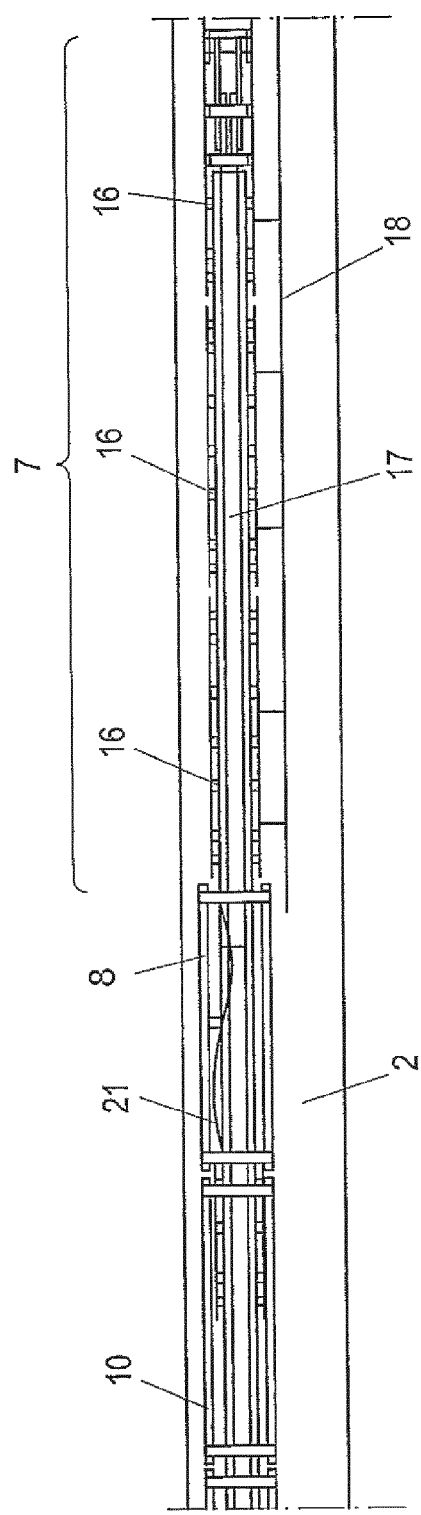
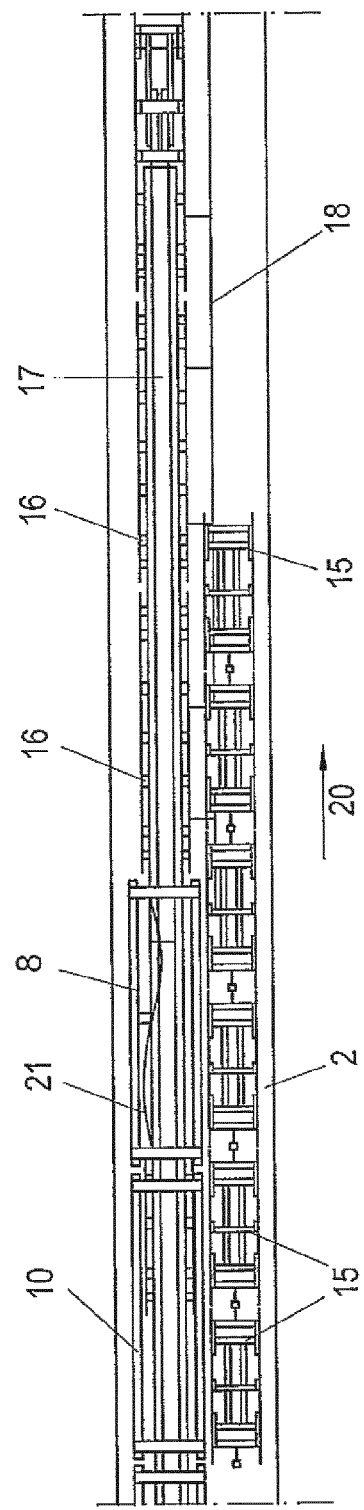
Fig. 2
Fig. 3

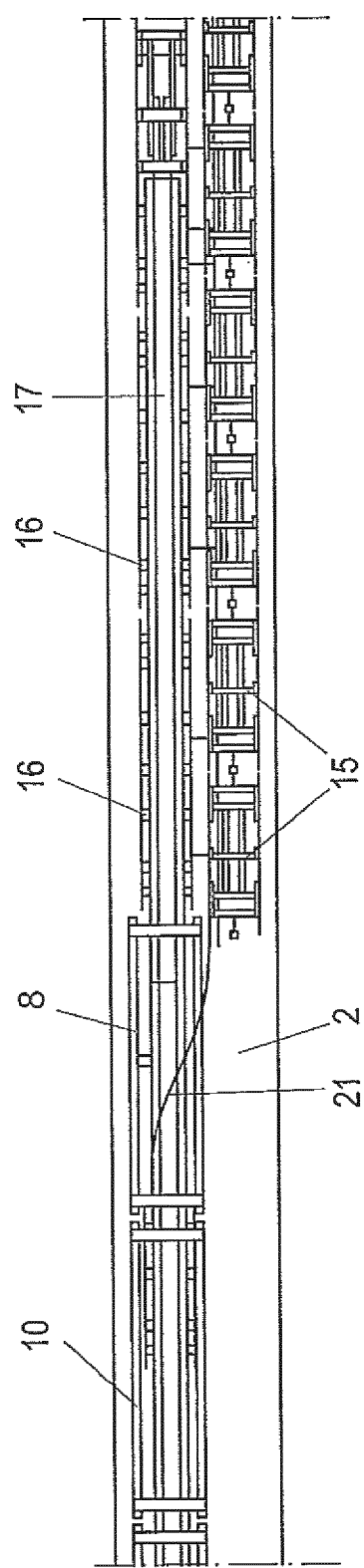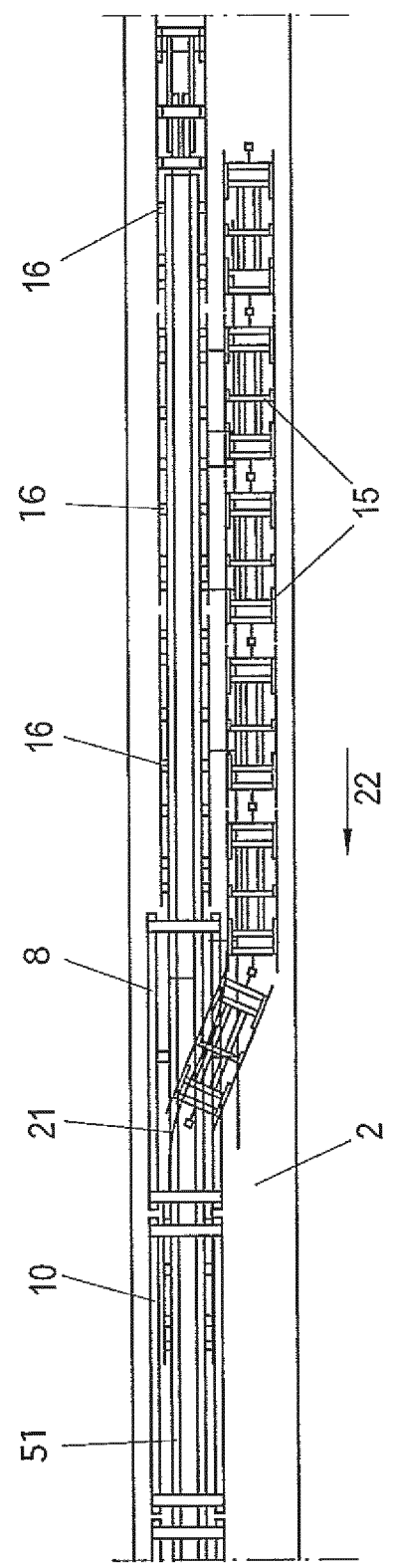

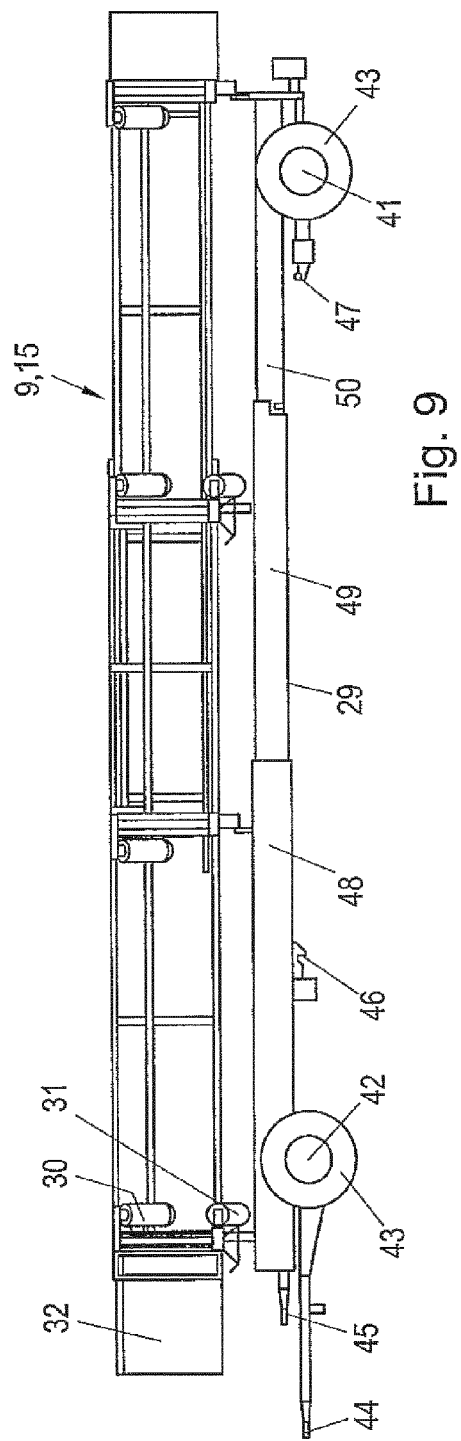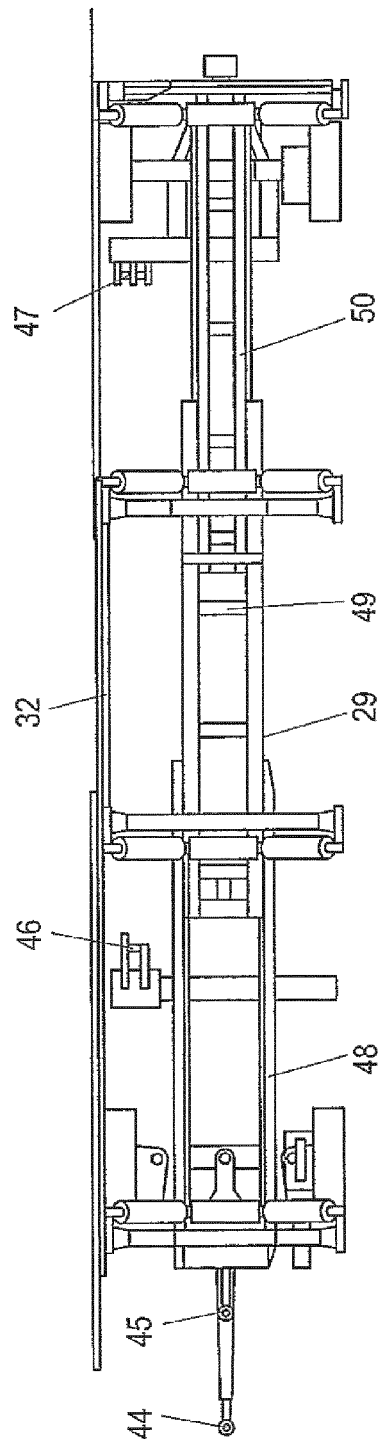

DISCHARGING OF MATERIAL EXCAVATED IN UNDERGROUND WORKINGS

RELATED APPLICATION DATA

This application is a §371 National Stage Application of PCT International Application No. PCT/EP2014/059716 filed May 13, 2014 claiming priority of AT Application No. A 443/2013, filed May 28, 2013.

The invention relates to a device for the discharging of material excavated in underground workings in a stretch excavated in particular in accordance with the room-and-pillar method, comprising a belt conveyor which comprises an endless conveyor belt, and the belt conveyor comprising a conveyor section which is continually extendible along a conveyor stretch in step with the excavating progress.

With what is referred to as the room-and-pillar method, first the main road stretch is excavated ("development"), the width of which corresponds essentially to the width of the heading machine. This is followed by excavation laterally outwards from the main road stretch in order to form chambers ("retreat mining"). In the retreat mining phase, the provision of support in the cavities by installations is avoided. Instead, the material is excavated from chambers, and in each case columns of rock or coal are left standing in order to support the roof.

The discharging of the excavated material can be carried out both during development as well as retreat mining with the aid of a belt conveyor system. The conveyor belt in this situation can be guided directly behind the excavator machine, and therefore must be capable of being continuously extended and developed. In order to avoid interruptions in the discharging operation due to the extending of the endless conveyor belt, conveyor belt stores are known which store the conveyor belt in a compressed state, folded over multiple times, from which a conveyor belt reserve can then be drawn out.

A number of different possibilities have already been proposed for the extension of the support frame for the conveyor belt. In WO 2008/031125 A2, an accommodation vehicle is described for accommodating the excavated material coming from the excavating machine, and a belt store, wherein a plurality of support elements are held in store in the accommodation vehicle. As the removal conveying develops, the belt is drawn out of the belt store and the individual support elements are taken from the accommodation vehicle and moved into the working position on the floor of the tunnel. A disadvantage with this arrangement is that the storage capacity of support elements in the accommodation vehicle limits the maximum scope for continuous extension.

From DE 3837986 A1, a carrying frame for a belt conveyor is known, which consists of a plurality of telescopic support elements, such that the carrying frame can be drawn out in order to allow for an extension of the conveyor stretch. The individual support elements are supported on the floor of the tunnel by means of skids. In this case, too, the extension of the conveyor stretch is limited, wherein the limiting factor is the maximum extendibility of the carrying frame.

With the conveyor system described in U.S. Pat. No. 5,246,274, the extension of the conveyor stretch is achieved by movable conveyor belt vehicles being introduced into the conveyor stretch. With this system, the extension of the conveyor stretch is limited only by the number of conveyor vehicles available and, as always, by the belt reserve available from the belt store. The disadvantage pertains, however, that the conveyor belt vehicles are introduced at the end of the conveyor stretch, such that at every point of time the entire chain of conveyor belt vehicles must be pulled up behind the excavating machine, which requires elaborate drawing devices.

The object of the invention is therefore to design a discharge device in such a way that uninterrupted conveying is achieved during an extension of a conveyor stretch, as well as during the retraction of the extension. It is further intended that the conveyor device should be capable of use both for the phase of development as well as for the phase of retreat mining. It is also intended that the scope of the conveyor stretch extension should only be limited by the belt reserve of the belt store and not by any other limiting factors. It is also intended that the extension elements of the conveyor belt support should be capable of the most versatile use possible.

To solve this object, the invention provides for a device for the discharging of material excavated in underground workings in a stretch excavated in particular in accordance with the room-and-pillar method, the device comprising a belt conveyor which comprises an endless conveyor belt, and the belt conveyor comprising a conveyor section which is continually extendible along a conveyor stretch in step with the excavating progress, wherein the belt conveyor comprises in the conveyor section, for the endless conveyor belt, at least one first support device capable of moving in the longitudinal direction of the conveyor stretch, and a plurality of conveyor belt vehicles being coupled to one another and being movable in the longitudinal direction of the conveyor stretch, the conveyor belt vehicles in each case carry support elements for the endless conveyor belt, and wherein, between the first support device and the plurality of conveyor belt vehicles, a second movable support device for the endless conveyor belt is arranged, the second movable support device is coupled to the first support device and comprises guide means for the introduction of conveyor belt vehicles into the conveyor stretch from a position arranged next to the conveyor stretch, wherein at least a part quantity of the conveyor belt vehicles arranged in the conveyor stretch is guided in the longitudinal direction of the conveyor stretch in movable guide frame elements coupled to one another.

The discharge device according to the invention therefore comprises at least three segments arranged one behind another of the support carrying the endless conveyor belt. The first movable support device is the first support in the transport direction, arranged behind the excavating machine, wherein, in this segment, the material is taken over either directly from the excavating machine or from an intermediate store for excavated material. Coupled to the first movable support device is the second movable support device, which forms the second segment of the conveyor belt support. The third segment is formed from the plurality of movable inter-coupled conveyor belt vehicles, which are uncoupled from the second support device. The conveyor belt vehicles are, however, guided in movable guide frame elements which are coupled to one another, wherein the guide frame element adjacent to the second support device can be coupled to it. For the extension of the conveyor stretch, additional movable conveyor belt vehicles are not now coupled to the end of the conveyor stretch, but by way of the second support device forming the second segment, which comprises guidance means for guiding the conveyor belt vehicles into the conveyor stretch from a position arranged next to the conveyor stretch. The conveyor belt vehicles are guided in this situation in the direction of the third segment, namely to the guide frame elements. In order to facilitate the guidance, the preferred procedure is for the top strand of the endless conveyor belt to be guided in an elevated position in the region of the second support device. Preferably, the second support device is formed as a movable frame element. Due to the guiding of new conveyor vehicles into the conveyor stretch in a middle position, the interruption-free extension of the belt support can be achieved. As well as this, with such an arrangement only the first and the second support devices are guided together with the guide frame elements behind the excavation machine, wherein the conveyor belt vehicles, which may be present in large numbers, can remain in their respective positions.

If the conveyor belt vehicles are unchangeable in their length, the conveyor belt vehicles are, as a rule, only introduced singly into the conveyor stretch, wherein, for the introduction of an individual conveyor belt vehicle, it is necessary in each case to wait for as long as necessary until an adequate gap pertains between the second support device and the nearest conveyor belt vehicle arranged in the conveyor stretch. However, if, as corresponds to a preferred embodiment, the conveyor belt vehicles are arranged as extendible and compressible in the longitudinal direction of the conveyor stretch, a plurality of conveyor belt vehicles can be introduced together into the conveyor stretch. The conveyor belt vehicles preferably comprise in this situation two, or preferably three, frame elements which are arranged so as to be pushed into one another in telescopic fashion. In this situation, the preferred method is for a plurality of inter-coupled conveyor belt vehicles to be introduced in the compressed state into the conveyor stretch.

Next, the frontmost conveyor belt vehicle, i.e. that conveyor belt vehicle which is located closest to the second support device, is connected to a guide frame element. This allows for the frontmost conveyor belt vehicle to be drawn along, when the first support device is drawn forwards, together with the second support device and the guide frame elements, behind the excavation machine, wherein the conveyor belt vehicles are continuously drawn out of each other telescopically. Only when the draw-out reserve of all the conveyor belt vehicles last introduced into the conveyor stretch has been exhausted does it become necessary for new conveyor belt vehicles to be introduced into the stretch. For the introduction procedure, that conveyor belt vehicle which is located in the last guide frame element, i.e. in that guide frame element which is the furthest located from the second support device, is secured to this guide frame element. This leads to the situation that the conveyor belt vehicles drawn out of one another and which are located in the guide frame elements will be pushed together, or compressed, as further conveyor belt vehicles are introduced. This results overall in a concertina effect, which leads to a plurality of conveyor belt vehicles being able to be simultaneously introduced into the conveyor stretch without interruption of the conveying process.

In order to prevent a sideways deviation of the conveyor belt vehicles arranged in the conveyor stretch when the conveyor belt vehicles already arranged in the stretch are compressed, the guide frame elements are provided. These are in particular arranged in such a way that they span/engage over the conveyor belt vehicles arranged in the conveyor stretch in the form of a portal or gantry. In this situation the guide frame elements provide in particular a lateral guidance on both sides of the conveyor belt vehicles. The guiding of the conveyor belt vehicles in the guide frame elements can preferably be improved by the guide frame elements comprising at least one guide element running in the longitudinal direction of the conveyor stretch, in particular guide rails, by which the conveyor belt vehicles arranged in the conveyor stretch are movably guided in the longitudinal direction of the conveyor stretch.

In order to connect a conveyor belt vehicle, as described heretofore, either to the first or the last guide frame element, provision is preferably made for the first and last guide frame elements to comprise in each case blocking means to block a relative movement of the conveyor belt vehicle arranged in each case in the guide frame element, relative to the guide frame element.

The conveyor belt vehicles to be introduced into the conveyor stretch can be held in store in large numbers next to the conveyor stretch, wherein a suitable tractor unit, such as a vehicle provided with a suitable drive, can be provided, which in each case transports a plurality of conveyor belt vehicles coupled to one another, next to the conveyor stretch, to the second support device. In order to ensure that there is an adequate guidance of the conveyor belt vehicles to be introduced during the introduction process, a preferred embodiment makes provision for the first support device to comprise a guide element running in the longitudinal direction of the conveyor stretch, in particular guide rails, by which the conveyor belt vehicles arranged next to the conveyor stretch are movably guided in the longitudinal direction of the conveyor stretch. The conveyor belt vehicles which are to be introduced are therefore guided laterally next to the first support device in the longitudinal direction, i.e. parallel to the conveyor stretch, and, as a consequence, reach the guide means of the second support device, which preferably can be formed as guide rails and in particular in an S-shape, in order to guide the conveyor belt vehicles, in a similar manner to guided-deflection, out of the position arranged next to the conveyor stretch into the conveyor stretch itself. The guide means of the second support device can in this connection be arranged as displaceable or pivotable in a manner similar to guided-deflector, and in this connection is preferably further arranged such that it can be repositioned into a position connecting the ends facing one another of the guide element of the first support device and of the guide element of the adjacent guide frame element.

For reasons of space, the conveyor belt vehicles which are to be introduced into the conveyor stretch are transported in a compressed state to the introduction point, wherein provision is preferably made for locking means to lock the compressed state, in order to prevent the traction force exerted by the tractor machine from drawing the conveyor belt vehicles out of one another.

As already mentioned, the upper strand is guided in elevated fashion in the region of the second support device, in order to facilitate the lateral introduction of conveyor belt vehicles. The arrangement is preferably further developed in this connection in such a way that the upper strand of the endless conveyor belt is guided rising upwards from the first support device to the second support device in ramp fashion, and from the second support device to the conveyor belt vehicles arranged in the conveyor stretch descending downwards in ramp fashion.

While the top strand is preferably supported in the area of the second support device on a plurality of support rollers, the bottom strand is preferably arranged hanging free, in order to allow for the lateral introduction of the conveyor belt vehicles. With the lateral introduction of the conveyor belt vehicles, attention must be paid in particular to ensuring that an adequate vertical distance interval is provided between the support elements located at the conveyor belt vehicles for the top strand and those for the bottom strand, in order to facilitate the threading of the bottom strand between the upper and the lower support elements. The arrangement is further developed in this connection in such a way that the conveyor belt vehicles comprise in each case support elements, in particular rollers or rolls, for the top strand, and support elements, in particular rollers or rolls, for the bottom strand, wherein the support rollers for the top strand are arranged such as to be pivotable upwards. A purposeful further embodiment makes provision in this connection that the support rollers for the top strand are automatically pivoted upwards when the conveyor belt vehicles are introduced into the conveyor stretch. This can be achieved in an advantageous manner in that the second support device comprises a ramp-like run-up element, with which the support elements for the top strand interact when conveyor belt vehicles are introduced into the conveyor stretch, in order to induce the upwards pivoting of the support elements.

The first support device can in principle be arranged at will, wherein preferably the first support device is formed from at least two inter-coupled movable conveyor belt vehicles of fixed length.

The first support device can, if required, comprise its own travel drive, in order to allow for the conveyor device to advance in step as necessary with the development progress of the excavating machine. In this situation the first support device draws the second support device and the guide frame elements behind it, wherein the second support device, the guide frame elements, and the conveyor belt vehicles do not comprise their own travel drives.

As an alternative, the first support device does not comprise its own travel drive, but is coupled to a separate tractor unit or to the excavating machine.

The invention is described in greater detail hereinafter on the basis of exemplary embodiments represented schematically. In these, FIG. 1 shows an overall view of a conveying device according to the invention in a stretch being developed in accordance with the room-and-pillar method, FIGS. 2 to 5 a view from above onto a front section of the conveyor device in different phases of the introduction of conveyor belt vehicles into the conveyor stretch, FIG. 6 an enlarged view of a section of the conveyor stretch, FIG. 7 a perspective view of the second support device serving to introduce the conveyor belt vehicles, FIG. 8 a perspective view of a conveyor belt vehicle in the extended state, FIG. 9 a side view of the conveyor belt vehicle according to FIG. 8, FIG. 10 a view from above onto the conveyor belt vehicle according to FIG. 9, FIG. 11 a side view of the conveyor belt vehicle in the compressed state, FIG. 12 a view from above onto the conveyor belt vehicle according to FIG. 11, and FIG. 13 a detailed view of the rollers of the conveyor belt vehicle supporting the conveyor belt.

In FIG. 1, a part region of a main stretch excavated according to the room-and-pillar method is designated by 1. From the main stretch 1, a side stretch 2 (retreat mining) leads away at an angle of 90° to the face 3. Arranged schematically at the face 3 is a roadheading machine 4, wherein the material excavated by the roadheading machine 4 is transported away via a bridge conveyor belt 5. The bridge conveyor belt 5 transfers the excavated material to the discharge device according to the invention, which comprises a movable belt deflection station 6 directly behind the bridge conveyor belt 5. In the belt deflection station 6 the endless conveyor belt of the discharge device is deflected. Connected to the deflection station 6 are a plurality of segments of the discharge device, namely a first support device 7, a second support device 8 in the form of a frame, and a plurality of extendible/extractable conveyor belt vehicles 9 coupled to one another, which are guided in a plurality of guide frame elements 10. Arranged next are further conveyor belt vehicles 11, coupled to one another, which exhibit a fixed vehicle length. The first support device 7, the second support device 8, the conveyor belt vehicles 9, and the conveyor belt vehicles 11 guide the endless conveyor belt to a deflection device 12, in which the endless conveyor belt is deflected by 90° into the main stretch 1. Arranged in the main stretch 1 is a conveyor belt store 13.

The material excavated by the roadheading machine 4 is transferred by means of the bridge conveyor belt 5 onto the belt deflection station 6, and is transported on the endless conveyor belt as far as a transfer station 14, which transfers the material onto a further discharge device, not shown, running in the main stretch 1.

Arranged next to the conveyor stretch formed by the endless conveyor belt, in the region of the first support device 7, are a plurality of conveyor belt vehicles 15, which, as explained in greater detail hereinafter, can be introduced into the conveyor stretch. Based on FIGS. 2 to 5, it is now shown how the further conveyor belt vehicles 15 are brought into the conveyor stretch. In FIG. 2, the first support device for the endless conveyor belt is again designated by 7, and comprises three movable conveyor belt vehicles 16 of fixed vehicle length coupled to one another. The conveyor belt vehicles 16 comprise support elements in the form of support rollers for the top strand and for the bottom strand. The top strand is designated in FIG. 2 by 17. The conveyor belt vehicles 16 carry on the side a guide rail 18, which, as explained in greater detail hereinafter, serves to guide the further conveyor belt vehicles 15. Coupled to the last conveyor belt vehicle 16 is the second support device 8, which is formed as a movable frame element for introducing the further conveyor belt vehicles 15. Coupled to the second support device 8 are a plurality of guide frame elements 10, of which only the first guide frame element is represented in FIG. 2.

Represented in FIG. 3 are now six further conveyor belt vehicles 15, which are moved laterally next to the conveyor stretch in the direction of the arrow 20 in the direction towards the face. The further conveyor belt vehicles 15 are in the compressed state, and are coupled to one another. The transport in the direction of the arrow 20 is carried out by a tractor unit, not shown, which is coupled to the first conveyor belt vehicle 15. On reaching the guide rail 18, guide elements, not represented in greater detail, of the conveyor belt vehicles 15 interact with the guide rail 18. The guide elements can be formed, for example, in a U-shape, and engage around the guide rail 18.

In the state of interaction with the guide rail 18, the conveyor belt vehicles 15 are moved further in the direction of the arrow 20, until they adopt the position represented in FIG. 4. The S-shaped guide rail 21 of the second support device 8 is then pivoted out of the position represented in FIG. 3 into the position represented in FIG. 4, such that the end of the guide rail 21 facing the further conveyor belt vehicles 15 is flush/aligned with the guide rail 18.

Starting from the position represented in FIG. 4, the conveyor belt vehicles 15 are then moved in the direction of the arrow 22, wherein the conveyor belt vehicles 15 are force-driven along the guide rail 18 and then along the guide rail 21, and in this way are introduced into the guide stretch. The end of the guide rail 21 adjacent to the guide frame element 10 is flush/aligned with a further guide rail 51, which is arranged in the guide frame elements 10. The conveyor belt vehicles 15 are therefore pushed into the guide frame elements 10, until all the conveyor belt vehicles 15 are introduced into the conveyor stretch. As the further conveyor belt vehicles 15 are introduced into the guide frame elements 10, the conveyor belt vehicles 9 which have already been arranged in the guide frame elements 10 are compressed in the longitudinal direction. Accordingly, if, before the introduction of the further conveyor belt vehicles 15 in the compressed state, there are already a total of six conveyor belt vehicles 9 in the extended state present in the guide frame elements 10, then these will be compressed, as the six further conveyor belt vehicles 15 are introduced, in such a way that thereafter there are a total of twelve conveyor belt vehicles (six conveyor belt vehicles 9 and six conveyor belt vehicles 15) in the compressed state present in the guide frame elements 10.

Figure 6:
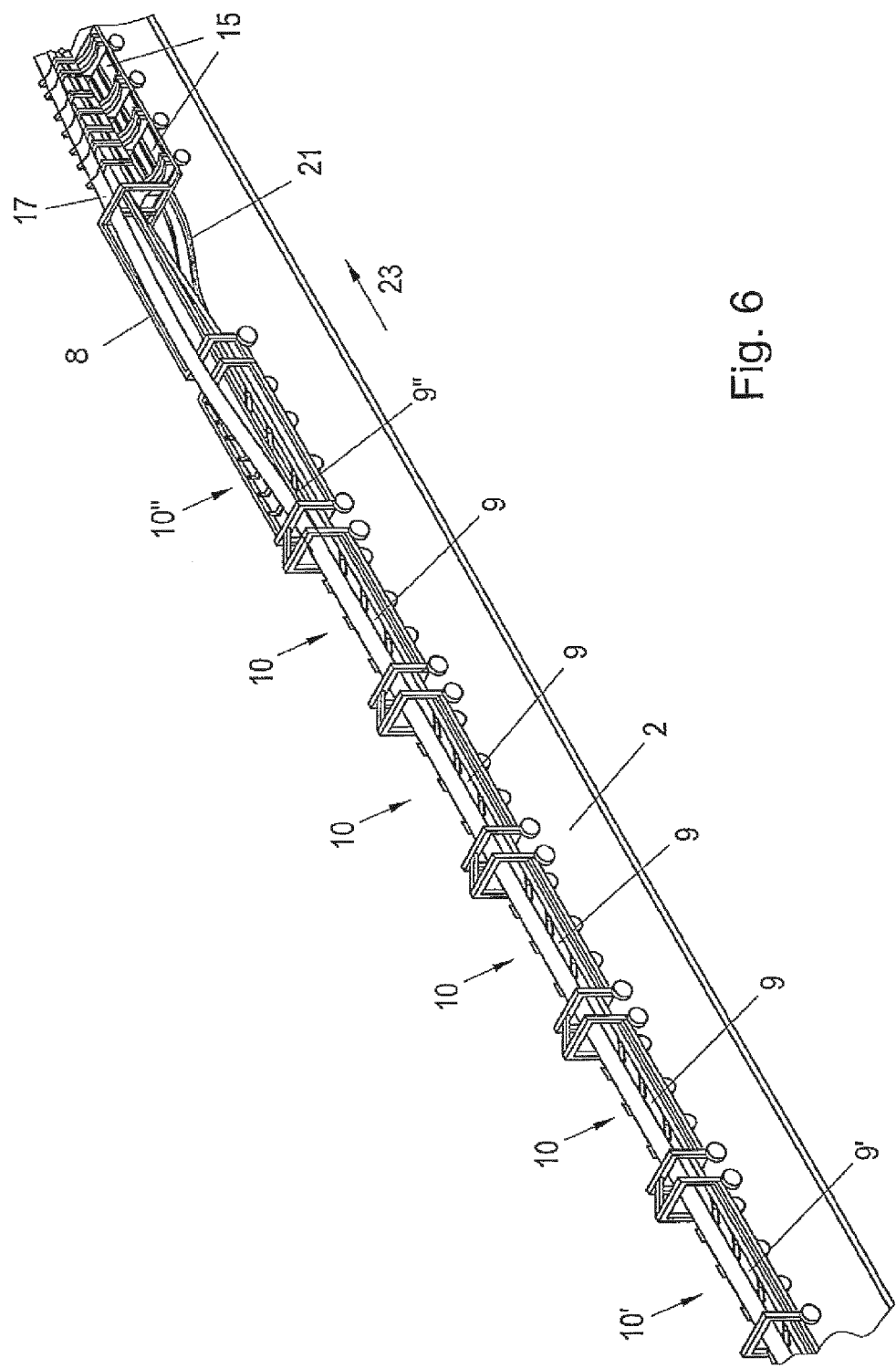

Shown in the detailed representation according to FIG. 6 is the state corresponding to FIG. 4. There are a total of six guide frame elements 10 arranged, which are coupled to one another. Located in the guide frame elements 10 are a total of six conveyor belt vehicles 9 in the extended state. Before the further conveyor belt vehicles 15 are introduced, the first conveyor belt vehicle 9' inside the guide frame element 10' allocated to it is secured against displacement, as a result of which the conveyor belt vehicle 9' cannot be pushed out of the guide frame element 10'. This is the precondition for the conveyor belt vehicle 9 being able to be compressed when the further conveyor belt vehicles 15 are introduced. The guide frame elements 10 serve in this situation to prevent a lateral deviation of the conveyor belt vehicles 9 during the compression procedure. For this purpose the conveyor belt vehicles 9 are guided at the guide rails 51 arranged in the guide frame elements 10, in the longitudinal direction of the conveyor stretch.

After the introduction of the conveyor belt vehicles 15, the blocking of the conveyor belt vehicle 9' in the guide frame element 10' is released. For the purpose of lengthening the conveyor device, the frontmost conveyor belt vehicle 9''' is secured within the frontmost guide frame element 10''' against displacement, such that the conveyor belt vehicle 9''', upon the trailing movement of the conveyor devices in the direction of the arrow 23, is carried along by the guide frame element 10'''. The trailing movement of the conveyor device takes place in this situation in such a way that the bridge conveyor belt 5 and the deflection station 6 are trailed in the direction of the arrow 23 in step with the excavation development of the roadheading machine 4. The deflection station 6 is coupled to the conveyor belt vehicles 16 such that these are drawn along with it. The conveyor belt vehicles 16 in turn draw the second support device 8, coupled to them, along with them. The second support device 8 in turn draws the guide frame elements 10, coupled to it, along with it. The frontmost guide frame element 10''', as already indicated, draws the frontmost conveyor belt vehicle 9''' along with it, such that there is altogether a continuous drawing out of all the conveyor belt vehicles 9.

In FIG. 6 it can further be seen that the top strand of the conveyor belt 17 is guided in an elevated position in the region of the second support device 8, wherein the second support device 8 carries corresponding support rollers for the top strand of the conveyor belt 17. In the region of the first guide frame element 10''', the top strand of the conveyor belt 17 is guided downwards again, wherein the guide frame element 10''' likewise carries corresponding support rollers. It is only in the region of the further guide frame elements 10 that the top strand of the conveyor belt 17 comes to lie on the support rollers of the conveyor belt vehicles 9.

Figure 7:
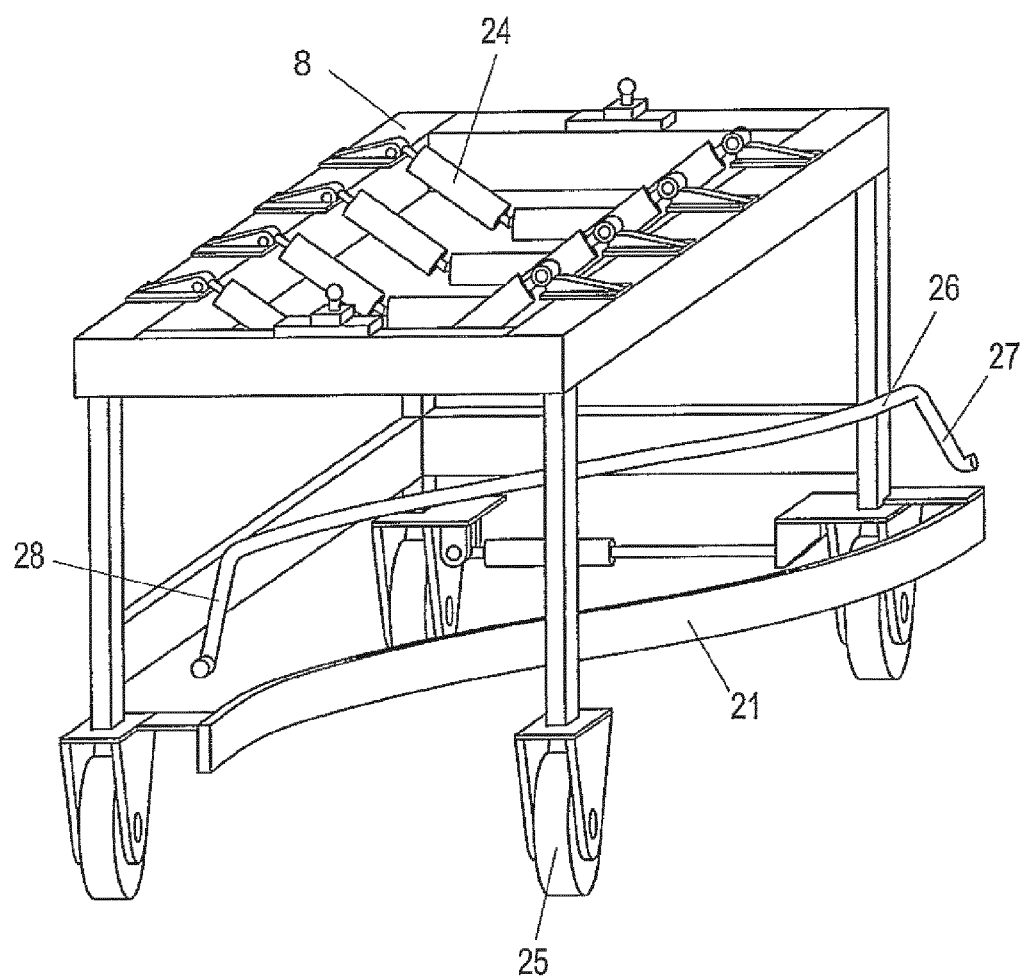

Represented in detail in FIG. 7 is the second support device 8, and it can be seen that this involves a frame-like structure, arranged on the upper side of which are support rollers 24 for supporting the top strand. No separate support elements are provided for the bottom strand, such that the bottom strand hangs freely in the region of the second support device 8. The second support device 8 comprises wheels 25, which allow for the movement of the support device. The S-shaped guide rails 21 can also be seen, along which the further conveyor belt vehicles 15 are introduced into the conveyor stretch. The second support device 8 further comprises a bar-shaped run-on element 26, which at its front end forms a rising ramp 27 and at its rear end a descending ramp 28. As is also explained hereinafter on the basis of FIG. 13, the run-on element 26 serves to pivot upwards the support rollers of the conveyor belt vehicles 15 provided for the top strand.

Figure 8:
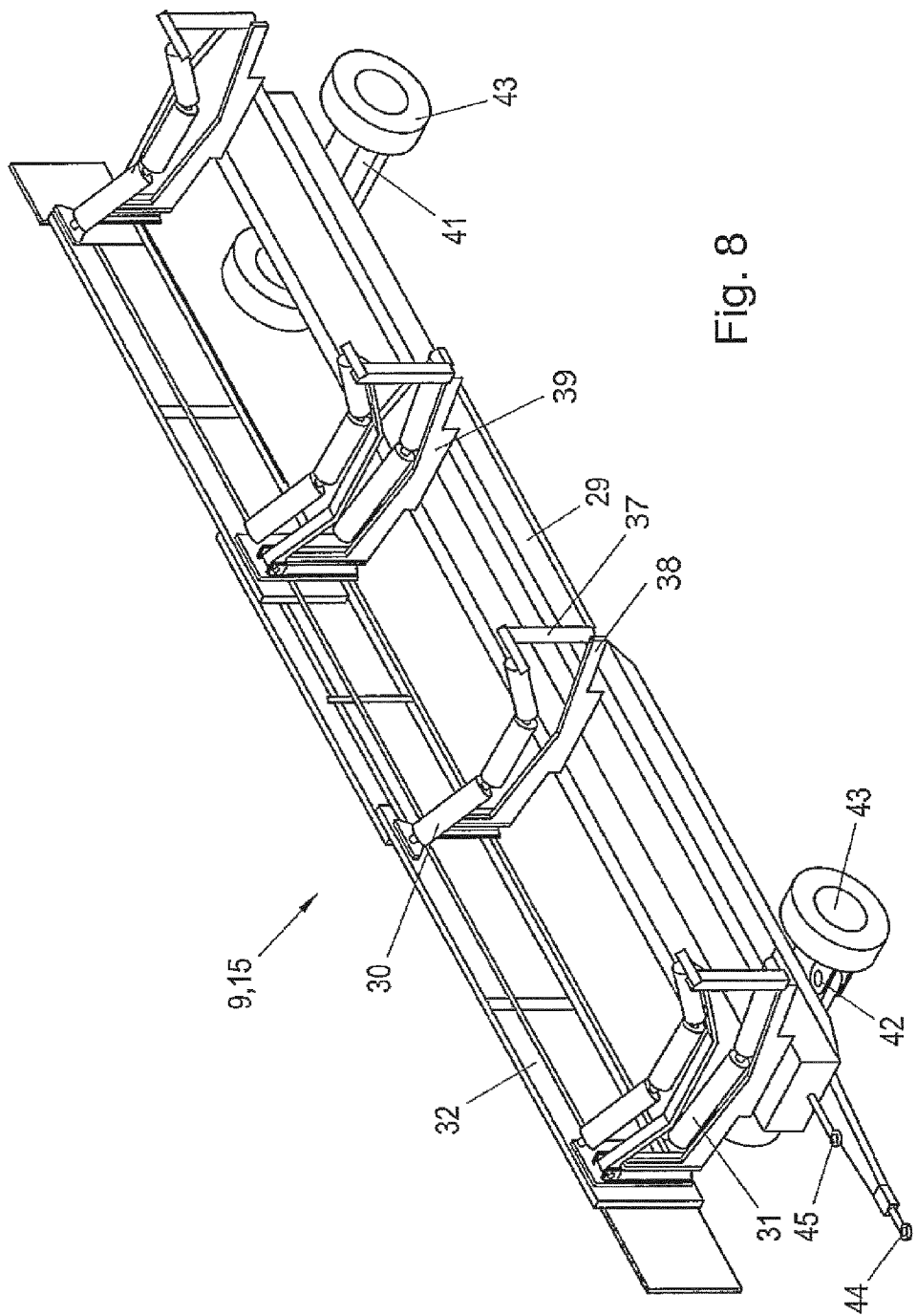
Figure 13:
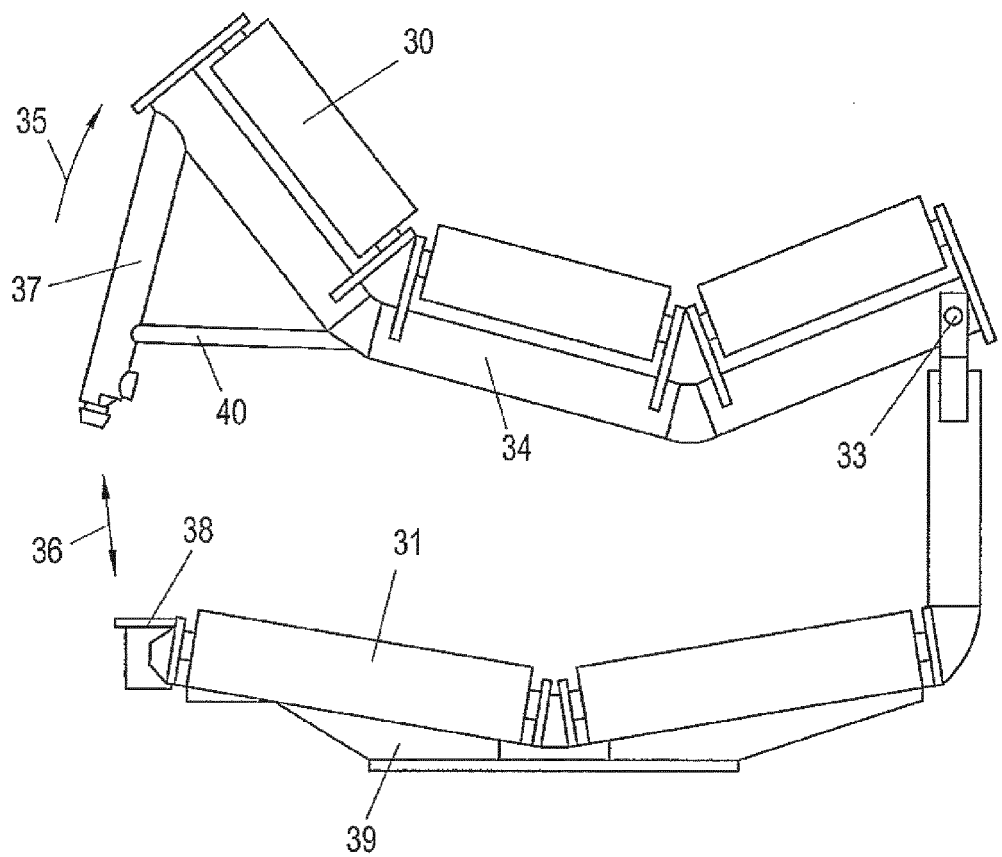

The conveyor belt vehicle is represented in detail in FIG. 8, wherein the representation applies likewise for the conveyor belt vehicles 9 and the further conveyor belt vehicles 15, since these can be designed as being of the same construction. The conveyor belt vehicles 9, 15 comprise a double telescopic frame 29, arranged on which are support rollers 30 for the top strand and support rollers 31 for the bottom strand. The frame 29 further carries a side protective grille 32. As represented in FIG. 13, the support rollers 30 for the top strand are secured to a frame part 34, mounted so as to pivot about the pivot axis 33, which, starting from the position represented in FIG. 8, can be pivoted upwards in the direction of the arrow 35 into the position represented in FIG. 13. As a result of this, a free space 36 is created, which, when the conveyor belt vehicles are introduced into the conveyor stretch, serves to allow the lateral introduction of the bottom strand of the endless conveyor belt 17. In the downwards pivoted state (FIG. 8), the support bar 37 of the pivotable frame part 34 lies on the bearing point 38 of the lower frame part 39. A guide strip 40 is also provided at the pivotable frame part 34, which, on the introduction of the conveyor belt vehicles into the conveyor stretch, runs onto the ramp 27 of the run-up bar 26, and therefore causes an upwards pivoting of the pivotable frame part 34. On reaching the ramp 28, the frame part 34 pivots under the force of gravity downwards again into the initial state.

In FIG. 8 it can further be seen that the conveyor belt vehicle 9, 15 comprises two axles 41 and 42, with wheels 43. The axle 41 in this situation is formed as a rigid axle, while by contrast the axle 42 is steerable, for which purpose a drawbar 44 is provided. The drawbar 44 serves in this situation to couple together conveyor belt vehicles 9, 15, arranged behind one another. Thanks to the steerable axle 42, the curve manoeuvring capability of the conveyor belt vehicle chain is ensured. By contrast, when the conveyor belt vehicles 9, 15 are pushed, the first conveyor belt vehicle is connected to the tractor unit by means of the coupling element 45 secured to the rigid frame 29, such that no transverse forces are introduced when the conveyor belt vehicles are pushed.

Figure 11:
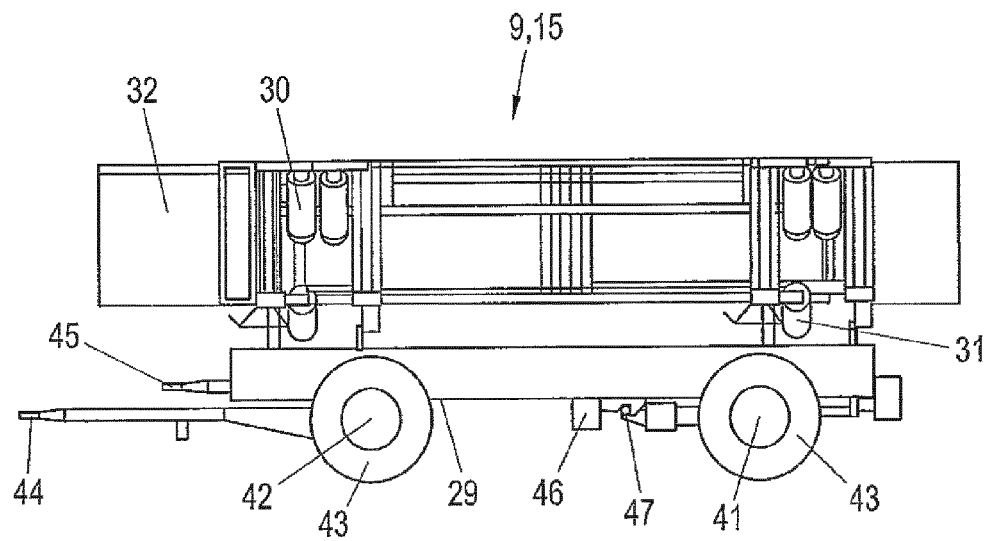

In the side view according to FIG. 9 it can be seen that a blocking hook 46 is secured to the underside of the frame 29, which can interact with a counterpiece 47 when the conveyor belt vehicles 9, 15, are in the compressed state, as represented in FIG. 11. As a result, the compressed state of the conveyor belt vehicle 9, 15, can be locked, which is of advantage in particular when transporting the further conveyor belt vehicles 15 within the side stretch 2 as far as the first or second support device respectively (FIG. 3) and when pushing them into the conveyor stretch.

Figure 12:
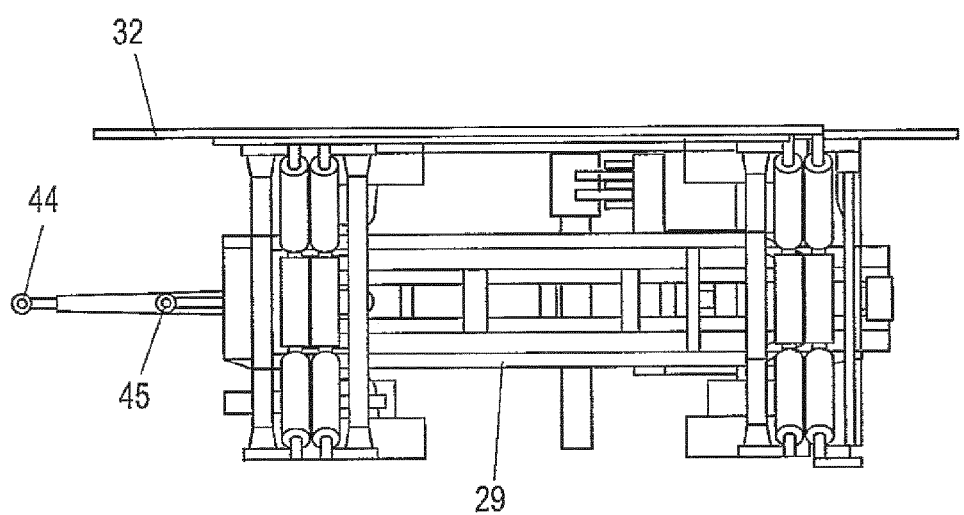

It can further be seen in FIGS. 9 and 10 that the frame 29 consists of three frame elements 48, 49, and 50, which can be telescoped into one another, such that the conveyor belt vehicles, starting from the extended state according to FIGS. 9 and 10 can be brought into the compressed state according to FIGS. 11 and 12, and vice-versa.

The invention claimed is:

1. A device for the discharging of material excavated in underground workings in a stretch excavated in a room-and-pillar method, the device comprising a belt conveyor having an endless conveyor belt, the belt conveyor including a conveyor section which is continually extendible along a conveyor stretch in step with an excavating progress, the belt conveyor including in the conveyor section, for the endless conveyor belt, at least one first support device movable in the longitudinal direction of the conveyor stretch, and a plurality of conveyor belt vehicles being coupled to one another and being movable in the longitudinal direction of the conveyor stretch, the conveyor belt vehicles being arranged to extend and compress in the longitudinal direction of the conveyor stretch, each of the conveyor belt vehicles having support elements for the endless conveyor belt, and wherein, between the first support device and the plurality of conveyor belt vehicles, a second movable support device for the endless conveyor belt is arranged, the second movable support device being coupled to the first support device and including guide means for the introduction of conveyor belt vehicles into the conveyor stretch from a position arranged next to the conveyor stretch, wherein at least a part quantity of the conveyor belt vehicles arranged in the conveyor stretch is guided in the longitudinal direction of the conveyor stretch in movable guide frame elements coupled to one another.

2. The device according to claim 1, wherein the movable guide frame elements engage in the form of a portal or gantry over the conveyor belt vehicles arranged in the conveyor stretch.

3. The device according to claim 1, wherein the movable guide frame elements are coupled to the second support device.

4. The device according to claim 1, wherein the conveyor belt vehicles include at least two frame elements, which are capable of moving telescopically into one another.

5. The device according to claim 1, wherein a first and a last guide frame element each include blocking means for blocking a relative movement of the conveyor belt vehicles arranged in each guide frame element relative to the guide frame element.

6. The device according to claim 1, wherein the conveyor belt vehicles include locking means for locking the vehicles in the compressed state.

7. The device according to claim 1, wherein the guide frame elements include at least one guide element forming a guide rail running in the longitudinal direction of the conveyor stretch, at which the conveyor belt vehicles arranged in the conveyor stretch can be movably guided in the longitudinal direction of the conveyor stretch.

8. The device according to claim 1, wherein the first support device includes a guide element, forming a guide rail running in the longitudinal direction of the conveyor stretch, at the guide element the conveyor belt vehicles arranged next to the conveyor stretch are movably guided in the longitudinal direction of the conveyor stretch.

9. The device according to claim 8, wherein the guide means of the second support device, which form a guide rail, can be displaced into a position connecting the mutually facing ends of the guide element of the first support device and of the guide element of the adjacent guide frame element.

10. The device according to claim 1, wherein a top strand of the endless conveyor belt is guided by the first support device rising in the form of a ramp to the second support device, and from the second support device descending in the form of a ramp to the conveyor belt vehicles arranged in the conveyor stretch.

11. The device according to claim 10, wherein the conveyor belt vehicles each include support elements, formed as rollers or rolls for the top strand, and support elements, formed as rollers or rolls, for a bottom strand, wherein the support elements for the top strand are arranged to be pivotable upwards.

12. The device according to claim 11, wherein the second support device includes a run-up element in the form of a ramp, with which the support elements for the top strand to interact at the introduction of conveyor belt vehicles into the conveyor stretch, to bring about the upwards pivoting of the support elements.

13. The device according to claim 12, wherein the first support device is formed from at least two inter-coupled movable conveyor belt vehicles of fixed length.

* * * * *